United States Patent [19]

Lemble et al.

[11] Patent Number: 5,414,846

[45] Date of Patent: May 9, 1995

[54] METHOD FOR FACILITATING THE CONFIGURATION OF PROGRAMS

[75] Inventors: Philippe Lemble, Saint Laurent du Var; Guy Menanteau, Nice; Stephen Pacchiano, Six Fours les Plages; Germain Sagols, Cagnes sur Mer; Alain Truchi, Saint Laurent du Var, all of France

[73] Assignee: International Business Machines Corporation, Armonk, N.Y.

[21] Appl. No.: 953,363

[22] Filed: Sep. 30, 1992

[30] Foreign Application Priority Data

Nov. 15, 1991 [EP] European Pat. Off. ............ 91480169

[51] Int. Cl.[6] .............................................. G06F 15/40
[52] U.S. Cl. ..................... 395/650; 395/600; 364/222.82; 364/286
[58] Field of Search ......................... 395/650, 700, 500

[56] References Cited

U.S. PATENT DOCUMENTS 5,287,488 2/1994 Sakata et al. ...................... 395/500

OTHER PUBLICATIONS

Conference on Software Tools, Apr. 15, 1985, New York, N.Y. US pp. 100–103 A. Lobba: "Automated Configuration Management".
Proceedings of the IEEE 1998 National Aerospace and Electronics Conference, NAECON 1988, vol. 2/4, May 23, 1988, Dayton, US pp. 600–607; K. Nix: "Change and Configuration Control in ADA Environments: The Stoneman Perspective Revisited".
AT&T Technical Journal, vol. 67, No. 4, Jul. 1988, New York, US, pp. 59–70, S. Cichinski et al: "Product Administration through SABLE and NMAKE".
IBM Technical Disclosure Bulletin, vol. 32, No. 3B, Aug. 1989, New York, US pp. 50–56: "Multiple Maintenance Library Support System".

*Primary Examiner*—Kevin A. Kriess
*Assistant Examiner*—John P. Chavis
*Attorney, Agent, or Firm*—John J. Timar

[57] ABSTRACT

A method for generating a new configuration of a program containing a plurality of modules and stored in a data processing system. A first table built in response to data entered by a user at a workstation contains the correspondence between each program function and an assigned user. A second table built in response to requests for creating or modifying specified functions indicates for each request, a request number, a description of the requested work, and the function assignee retrieved from the first table. Then, a message is sent to a function assignee that contains the request number and description of the requested work. A third table built in response to users starting the work requested contains for each request number, a status for the requested work. By reading the third table, a report of the status of the requests is prepared which helps the program administrator to prepare a new configuration of the program.

7 Claims, 12 Drawing Sheets

OPERATOR AT EACH WORKSTATION
CAN BE: THE PROGRAM DESIGNER
THE TESTER OF THE PROGRAM
THE PROGRAM ADMINISTRATOR

FIG. 4

CHANGE REQUEST FILE (74)

| CHANGE REQUEST NUMBER ||
|---|---|
| ORIGNATOR ID: | CHANGE DESCRIPTION |
| ASSIGNEE ID: | |
| STATUS: | |
| CONFIG. ID: | |

STATUS: - OPEN
          - ANSWERED
          - REJECTED
          - CLOSE

FIG. 8A
C R N = CHANGE REQUEST NUMBER

PROGRAM ID.

REASON TABLE / 115

| CHANGE REQUEST NUMBER #1 ||
|---|---|
| MODULE ID#A | MODULE ID#B |
| CORRECTOR ID | CORRECTOR ID |
| STATUS | STATUS |
| MODULE ID#C | |
| CORRECTOR ID | |
| STATUS | |
| CHANGE REQUEST NUMBER #2 ||
| MODULE ID#A | MODULE ID#D |
| CORRECTOR ID | CORRECTOR ID |
| STATUS | STATUS |
| | |
| CHANGE REQUEST NUMBER #3 ||
| MODULE ID#A | MODULE ID#E |
| CORRECTOR ID | CORRECTOR ID |
| STATUS | STATUS |
| CHANGE REQUEST NUMBER #4 ||
| MODULE = D#F | MODULE ID#C |
| CORRECTOR ID | CORRECTOR ID |
| STATUS | STATUS |
| | |
| | |

CRN #1 → (CHANGE REQUEST NUMBER #1)
CRN #2 → (CHANGE REQUEST NUMBER #2)
CRN #3 → (CHANGE REQUEST NUMBER #3)
CRN #4 → (CHANGE REQUEST NUMBER #4)

FIG. 10

LIST OF CHANGE REQUESTS WITH ALL MODULES "CAPTURED" OR "INTEGRATED" (144)

.CHANGE REQUEST:1          CONFIG-ID:X

| MODULE ID | CORRECTOR ID. | FUNCTION | STATUS |
|---|---|---|---|
| A | ——— | ——— | CAPTURED |
| B | ——— | ——— | CAPTURED |
| C | ——— | ——— | INTEGRATED |

.CHANGE REQUEST:2          CONFIG-ID:X

| A | ——— | ——— | CAPTURED |
| D | ——— | ——— | CAPTURED |

LIST OF CHANGE REQUESTS "INCOMPLETE"

.CHANGE REQUEST:3          CONFIG-ID:X

| MODULE ID | CORRECTOR ID. | FUNCTION | STATUS |
|---|---|---|---|
| A | ——— | ——— | INTEGRATED |
| E | ——— | ——— | USER |

LIST OF OTHER CHANGE REQUESTS: CONFLICTS

.CHANGE REQUEST:4          CONFIG-ID:Y

| MODULE ID | CORRECTOR ID. | FUNCTION | OTHER C R N |
|---|---|---|---|
| C | ——— | ——— | 1 |
| F | ——— | ——— | ——— |

METHOD FOR FACILITATING THE CONFIGURATION OF PROGRAMS

DESCRIPTION OF THE INVENTION

The subject invention relates to a method for facilitating the configuration of program parts or modules in order to deliver a new program or an updated/corrected version of an existing program.

BACKGROUND ART

Today, programs have become more and more complex; they comprise a high number of instructions, and cannot be developed by a single program designer. Generally, they are developed by a designer group wherein each person is in charge of writing a piece of the program, which is called part or module.

The configuration operation of the program consists in assembling the program pieces in order to produce a coherent and consistent program either to deliver a new function or to correct some defects from the previous delivery or release.

This operation is an important activity in program development, and it is performed at the latest stage, just prior to the final delivery or release. Configuring or re-configuring is triggered by the need either to deliver a new function or to correct some defects in the current release.

A change which may be required to create functions, correct a defect or modify a function is requested by a change originator who generally has no means to control whether his requested change has actually been implemented, or not.

The change is made by the owner of the module, i.e the program designer responsible for developing the module, without any relation to a specific functional update or defect correction.

A system administrator sets up a list of modules to be integrated in a new configuration, by hand and from his best judgement. It results therefrom, that some pieces can be missed. This lack appears either at compiling or linking time or at testing time or even after delivery to the customer, which is a major drawback. Furthermore, the process is lengthy and lacks accountability.

OBJECTS OF THE INVENTION

The object of the invention is a method which facilitates the configuration of programs.

Another object of the invention is a method which facilitates reconfiguring an existing program in order to integrate new functions or updated functions.

Another object of such an invention is a method which reduces the configuration time of a program by a significant factor.

SUMMARY OF THE INVENTION

The method according to the subject invention is implemented by using a data processing system accessible by a plurality of users through workstations. It is characterized in that it comprises the steps of:
(a) building a first administration table in response to data entered by a user at a workstation, said first table comprising the correspondence between each function of a program and a user assigned to said function,
(b) building a second request table in response to requests for creating or modifying specified functions, said requests originating from users and said second table comprising for each request, a request number, a description of the requested work, the function assignee retrieved from the first table,
(c) sending a message to any function assignee corresponding to a request stored in the second table, said message comprising the request number and the description of the requested work,
(d) building a third reason table in response to users starting the work requested per a selected request, said third table comprising for each request number, a status set to a first value (USER) when a user is making the work, to a second value when the work is completed, and to a third value when the function is integrated in a program configuration,
(d) reading said third table in response to a command from a user indicative that a configuration is to be started, for preparing a report of the status of the requests.

The major advantage of the present invention results from the use of the reason table, which makes the link between a request number and the program parts which have to be created or modified to implement the work requested under each request number.

BRIEF DESCRIPTION OF THE FIGURES

FIG. 4 represents the contents of the change request file.

FIG. 10 represents the report which is prepared for the program administrator to facilitate the configuration operation according to the present invention.

DETAILED DESCRIPTION OF THE INVENTION

Figure 1:
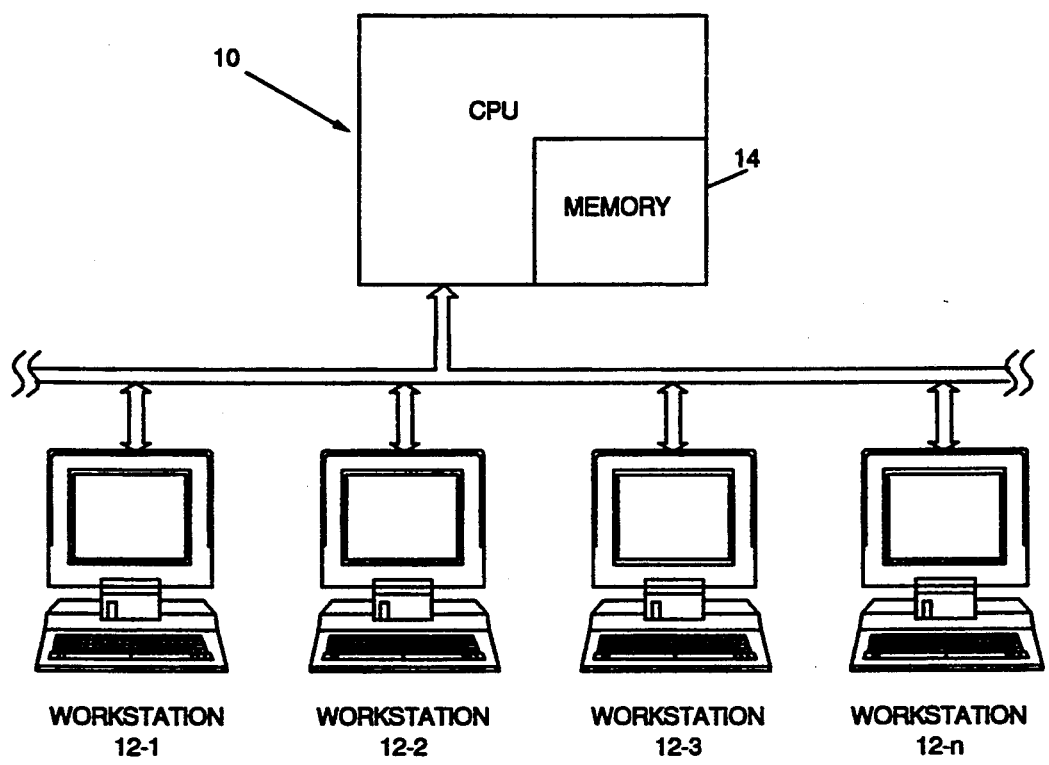
FIG. 1 schematically represents a data processing system used for implementing the method according to the invention.

Generating a new configuration of a program is the result of a complex process including several participants, as the originator of a request for a new function or for a correction of function (such a request will be called a change request in the description), the owners of the modules involved in the change request, (i.e the program designer responsible for the development of the modules and able to make the changes), and the system administrator which manages the program library.

In this environment, the method according to the present invention provides a link between the participants in order to:

allow the owners of the modules to make the changes with an explicit relation to a specific update or defect correction, allow the originator of the change request to control whether the change has actually been implemented or not, allow the system administrator to list the changes to be integrated in the new configuration without any mentioning of the related modules.

It results therefrom that a list of related source code modules is obtained to make it easy to integrate the changes in a new desired configuration of the program.

The method according to the invention is implemented through a system which is responsive to commands entered by an operator at a workstation to prompt the operator so that he/she can key in information and send it to the system through an enter command, in order that the system processes the entered information as will be described in reference to the figures.

Let's assume the system includes an host computer operating in a VM/SP environment. Each person or end user is assigned a Virtual Machine in the system. Virtual Machine is, in fact, a predetermined size memory location, sometimes referred to as user's "A disk" and means to share common hardware and software resources, essentially including the IBM Control Program CP and Conversational Monitor System CMS, each including its own types of services. Resources managed by CP include: processor functions, processor storage and input/output devices. CP creates the system work environment. It controls the system resources that are available to the user during a work session.

CMS, although a component of the VM/SP operating system, is itself an operating system running under CP. As the name "conversational" implies, there is a two-way communication between the system users and CMS.

A user may initiate a session using any of the terminals and, through a log on procedure, read his/her machine. Logging-on means sending an interrupt command from the terminal keyboard to read CP facilities and then identifying himself/herself to the system by typing a personal identification code (userid) and in most cases a password. Password use enables the preventing of access to a given machine by anyone but the machine owner. Passwords are secret and known to the sole owner. Then CMS resources and/or any other software resources and/or any other specific software such as one designed to implement the subject invention may either be accessed on request or be accessed directly. This is defined in the user's PROFILE EXEC routine tailored to identify the available resources assigned (i.e. made available) to the specific user upon originally defining the user's machine.

This environment is schematically represented in FIG. 1 by a system constituted of control and application programs run by a central processing unit as shown by 10 in FIG. 1. Each participant to a program development using the subject invention, has access to the system through a workstation or terminal such as 12-1 to 12-n by means of which he can establish sessions with the system 10, enter commands through the workstation keyboard, be prompted by the system 10 which causes various screens to be displayed to the participant (operator), so that he can enter the prompted information to the system. In accordance with the present invention, the system builds tables, files and file lists into a system memory 14, in response to the entered information. The operator is known to the system through a user identification as described before.

When a program is designed to perform a set of functions, each function is split into a plurality of modules. The development of each function is under the responsibility of a function assignee. A module identification is assigned to each module and the development of each module is under the responsibility of a module owner.

Figure 2:
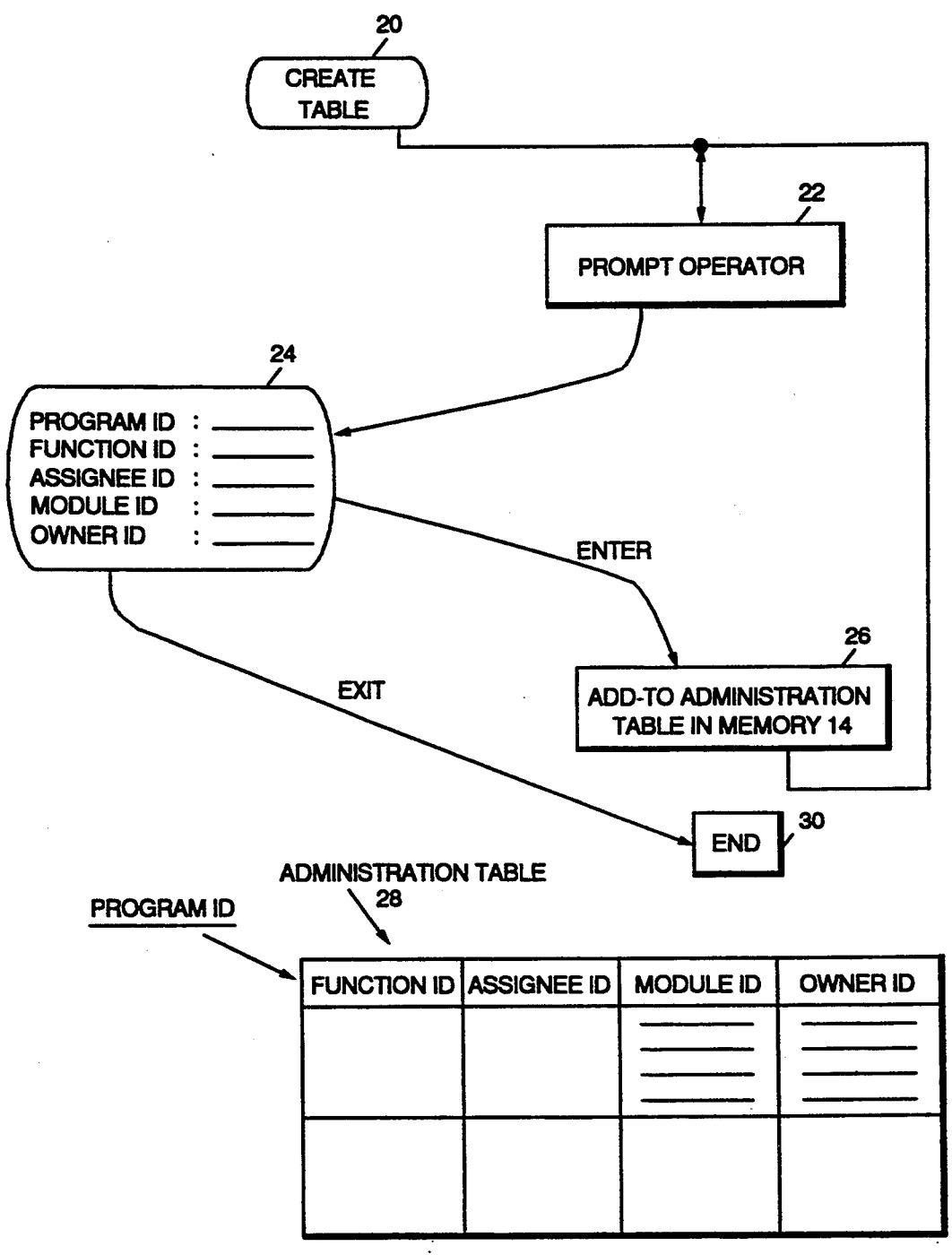
FIG. 2 shows the process implemented to create the administration table.

FIG. 2 shows the process which is implemented by the system to create or update an administration table, which is then used for the implementation of the method according to the present invention.

An operator at a workstation establishes a session with the system 10 as is usual and then enters a CREATE TABLE command, at the workstation keyboard.

The CREATE TABLE command is received by the system 10, this is the first step 20 of the process. In response thereto, the system prompts the operator at step 22, by displaying a screen 24 at the operator workstation. The prompted operator keys in the requested data, i.e the program identification which can be a name or number, the function identification, the function assignee identification, the module identification and the module owner identification. The function assignee identification and module owner identification are the user identifications known by the system.

When the operator has keyed in the requested information, he presses the ENTER key of the workstation keyboard. The system processes the information and adds it to an administration table, at step 26. The administration table 28 comprises for each program, the correspondence between the function identification, assignee identification, module identification and module owner identification.

The process is resumed at step 22, to enter the information needed to build the complete administration table for each function of the program.

The process is ended at step 30 when the operator presses the exit key.

Figure 3:
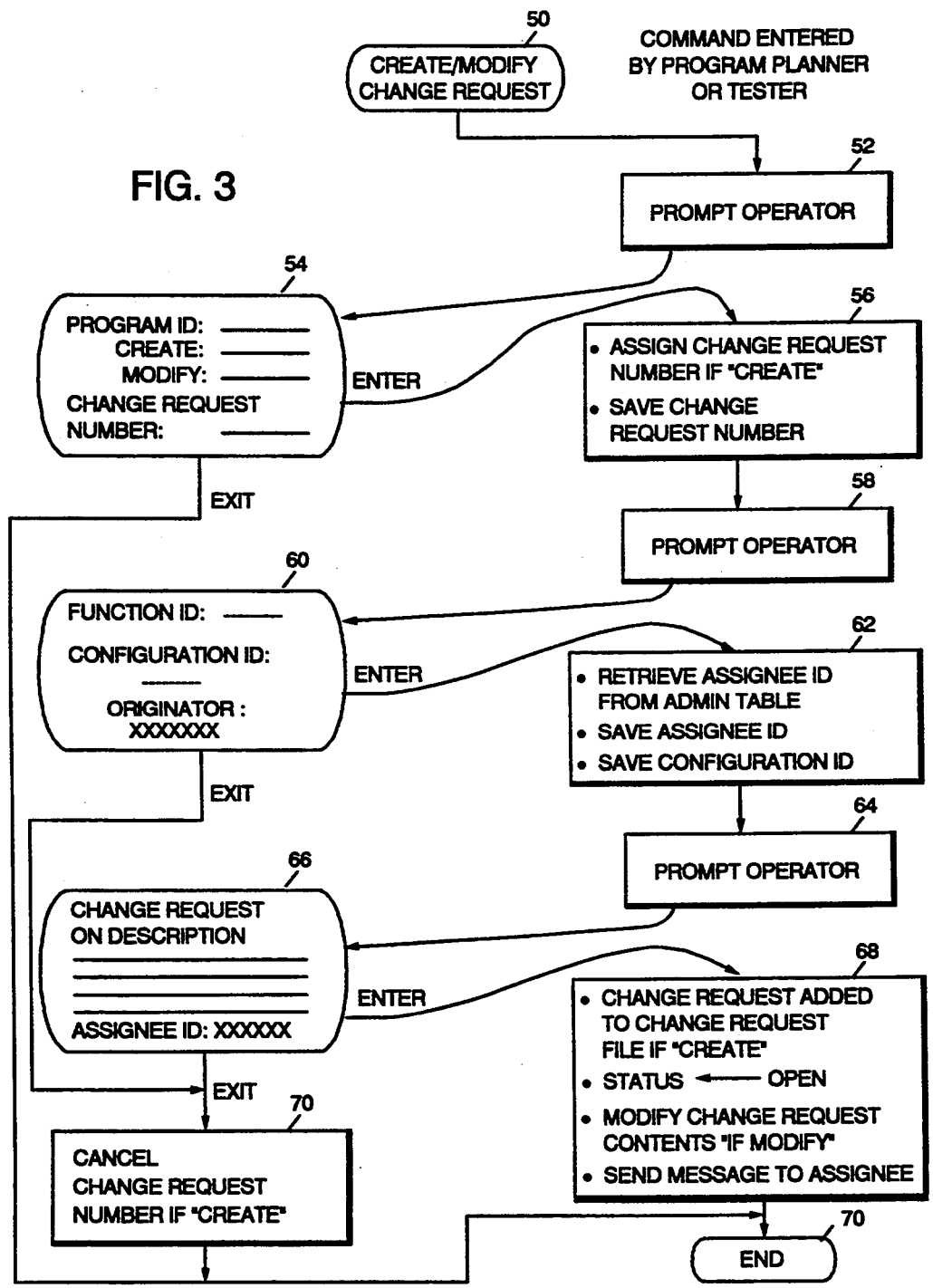
FIG. 3 shows the process implemented to create the change request file.

FIG. 3 shows the change request process which is run by the system, under the control of a program manager or program tester, prior to the module owner writing the source code lines of his module or prior to correcting or changing the source code lines of his module.

The operator enters a CHANGE REQUEST command which is received by the system at step 50. This command is used to create a change request file shown in FIG. 4 or to modify information in the change request file.

In response to this command, the system prompts the operator at step 52 with screen 54. To create a new change request input to the change request file, the operator keys in the program identification, to modify the change request file, he keys in the program identification and change request number to be modified.

In response to a CREATE CHANGE REQUEST command, the system assigns a change request number to create a new input to the change request file. This new number is taken from a list of free change requests. In both cases, i.e. to create a change request input or modify an existing change request, the system saves the assigned or keyed in change request number. This step is shown at 56.

Then the system prompts the operator, at step 58, with screen 60.

The operator keys in the requested information, i.e function identification, configuration identification for which a change request is made, and the change request originator identification. By default, the system displays the operator user identification as originator identification, as represented by xxxxx in FIG. 3. The operator may change this identification, if needed.

Then he presses the enter key and in response thereto the system retrieves the assignee identification from table 28. It saves the assignee identification and configuration identification, these operations are performed at step 62.

The system prompts the operator at step 64 with screen 66.

The operator keys in the requested information: change request description, the assignee identification is displayed on screen 66.

The change request description depends upon the function development phase, for example to create the function, the change request description can be: "create the function . . . "; to make a function change/correction, the change request description can be: "correct the function to eliminate the problem of . . . "

When screen 66 is filled, the operator presses the enter key. In response thereto, at step 68, the change request is added to the change request file 74 shown in FIG. 4, or the change request file is changed. A message is sent to the assignee.

After that the process is ended at step 70.

The process is also ended if the operator presses the exit key when screen 54 is displayed. If he presses the exit key when screen 60 and 66 is displayed, the system cancels the change request number assigned at step 56, and then the process is ended.

The change request file 74 shown in FIG. 4 comprises for each change request number, the originator identification, the assignee identification, a change request status which is set to OPEN, when a change request input is created, the change request description which is inputted to the system through screen 66 and the configuration identification which is inputted through screen 60.

The message which is sent to the assignee at step 68 reflects the contents of the file 54 for the change request number which is added or modified through the process shown in FIG. 3.

The different options available for change request status are OPEN, ANSWERED, REJECTED, CLOSED. The status is changed as will be described later on in reference to FIGS. 6 to 11.

When the assignee receives a message such as the one sent at step 68, he has to answer it.

Figure 5:
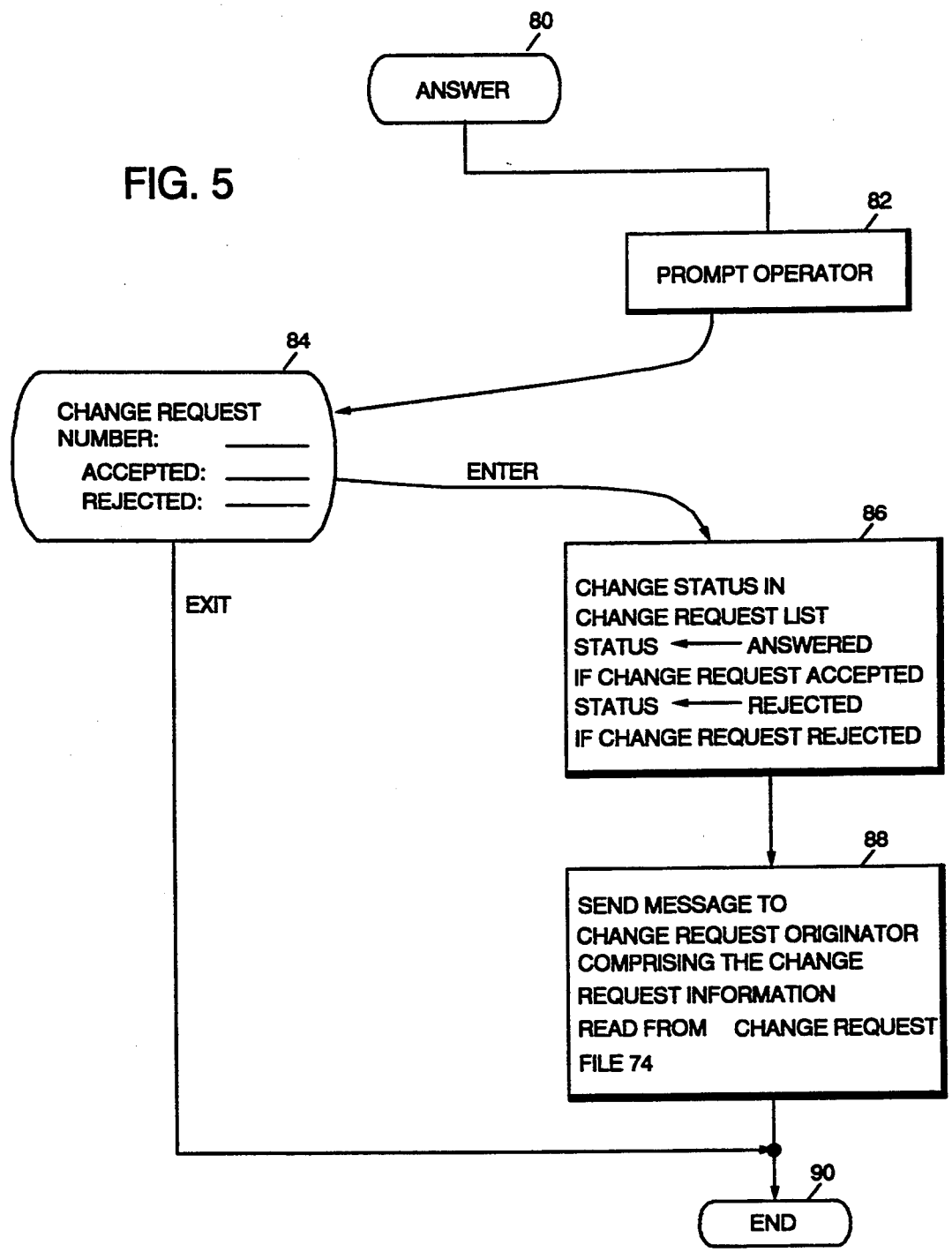
FIG. 5 shows the process implemented to answer a change request.

To do that, he enters an ANSWER command, which is received by the system at step 80 in FIG. 5.

In response thereto, the system prompts the operator (step 82) with screen 84. The assignee keys in the change request number and indicates whether he accepts or rejects the change request, then he presses the enter key.

As shown at step 86, the system accesses the change request file 74 at the change request number address, and set the change request status to ANSWERED if the assignee accepts the change request or to REJECTED if he rejects it. The contents of the change request area at the change request number address is saved.

Then, at step 88, the system sends a message to the change request originator whose identification is found in the change request file 74, said message comprising the change request contents saved at step 36.

The answering process is ended as shown at step 90. The process is also ended if the operator presses the exit key when screen 84 is displayed.

Then, the assignee of the function affected by the change request asks the module owners to work on their modules to implement the changes described in the change request message he has received.

Figure 6:
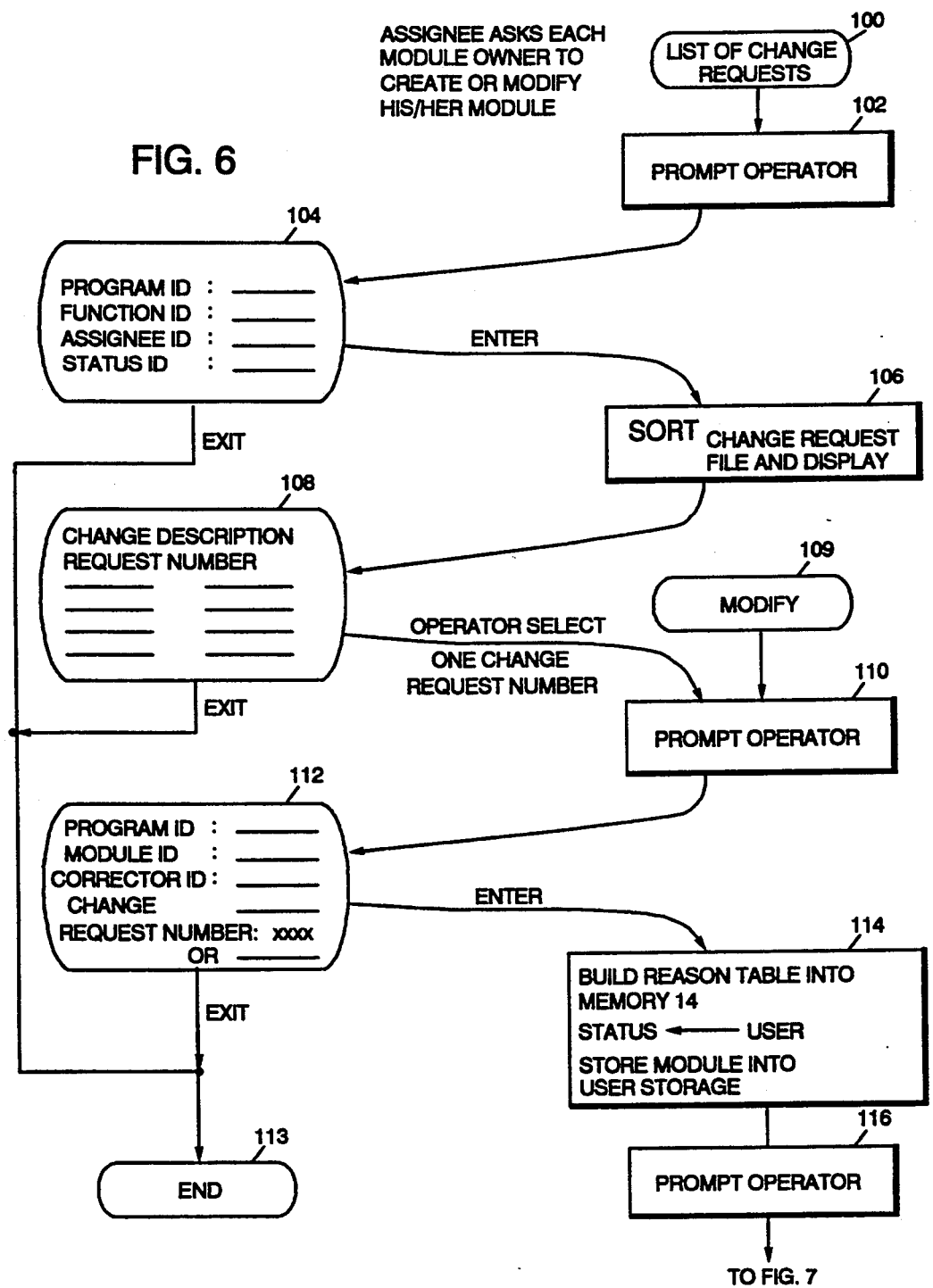
FIG. 6 shows the process implemented when a designer starts working on a module.
Figure 7:
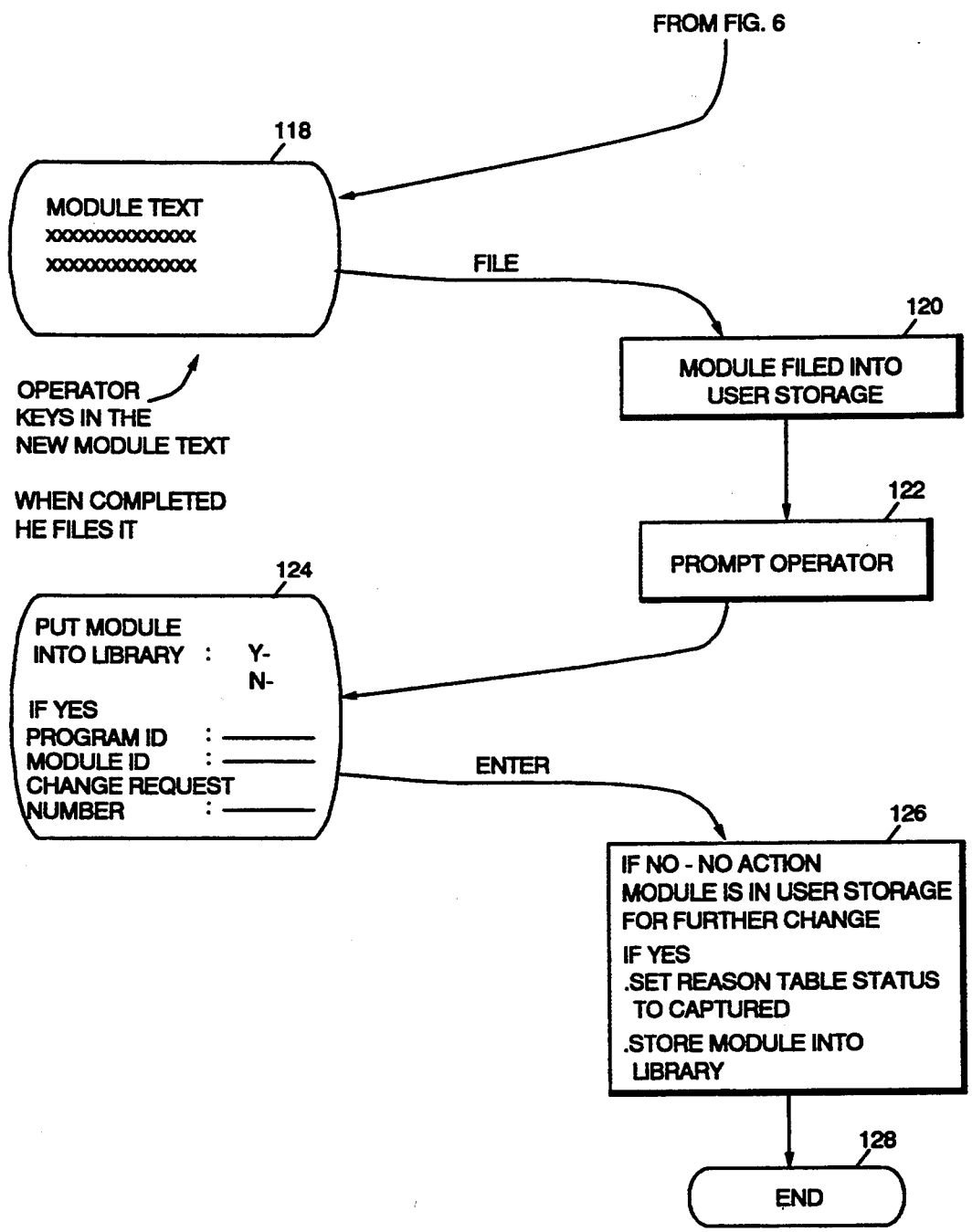
FIG. 7 shows the process implemented for creating or modifying a module.

The process implemented by the system to do that work is shown in FIGS. 6 and 7.

Each module owner, enters either a LIST OF CHANGE REQUESTS command, or a MODIFY command to start his job.

The LIST OF CHANGE REQUESTS command is received by the system as shown at 100. The next step 102 consists in prompting the operator with screen 104. He enters the requested information such as the program identification, the function identification, the assignee identification and the status, for example, "ANSWERED".

The next step 106 consists in sorting the change request file and displaying all the change request numbers and descriptions having the status keyed in at screen 104.

The operator selects one change request number through the cursor or mouse of the workstation. In response thereto the operator is prompted at step 110 with screen 112.

The operator keys in the requested information, i.e program identification and module identification, the corrector identification which can be different from the module owner identification; the selected change request number is displayed by the system. Step 110 may also be entered if the operator enter a MODIFY command which is decoded as shown by block 114. In that case, the operator has to key in a change request number in addition to the other requested information on screen 112.

At each screen 104, 108, 112 the operator has the capability to exit at step 113.

Figure 8B:
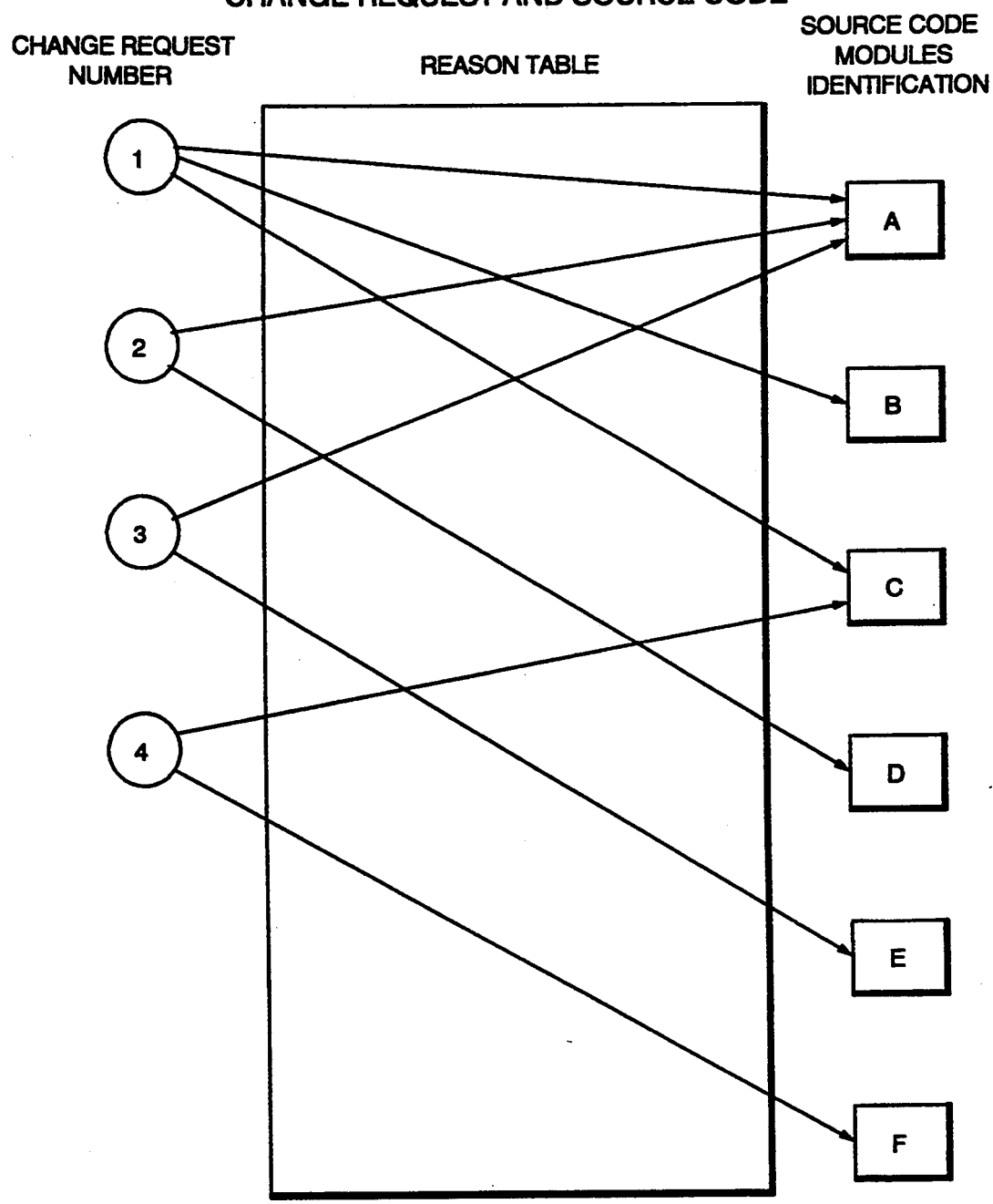
FIG. 8A shows the contents of the reason table which makes the link between the change request numbers and modules involved by the change requests, as shown in FIG. 8B.

In response to the information entered on screen 112, the system builds a reason table shown in FIG. 8-A and stores the module into the user storage, step 114. Then, the operator is prompted (step 116) with screen 118 shown in FIG. 7. This starts the process of creating or modifying a module.

When in the USER status, the module cannot be transferred to another user storage in order to prevent several operators from working on the module.

The reason table is a key element in the implementation of the present invention. This table comprises for each change request number, the module identification, the corrector identification and a module status. There are at least three options available for module status, namely USER when the module is stored into the user storage at step 114, CAPTURED when the changed module is transferred into the library and is a candidate to be integrated in a new program configuration, and INTEGRATED when the module is integrated.

When the module has been stored into the user storage at step 114, the corrector creates a file incorporating the source code lines of the module or modifies the module source code lines, depending upon the change request description. At any time, he may file the module into his user storage by entering a file command, as shown by step 120. In response thereto, the system prompts the operator as shown by step 122, with screen 124.

The operator is requested, whether he wants the module to be put into the library or not.

If yes, which means that he has completed his work on the module, he keys in the program identification, the module identification and the change request identification and the change request number.

Then, he presses the enter key.

The system enters step 126. If the keyed in information is NO, the system takes no action which means that the module is in user storage for further change.

If the keyed in information is YES, the status in the reason table for the related change number and module is set to CAPTURED and the module is stored into the library.

All module owners/correctors work on their modules in relation to the change request numbers in the change request list.

As shown in FIG. 8-B, the reason table is a link between the change request number such as 1,2,3,4, and the related modules A,B,C,D,E,F.

Figure 9:
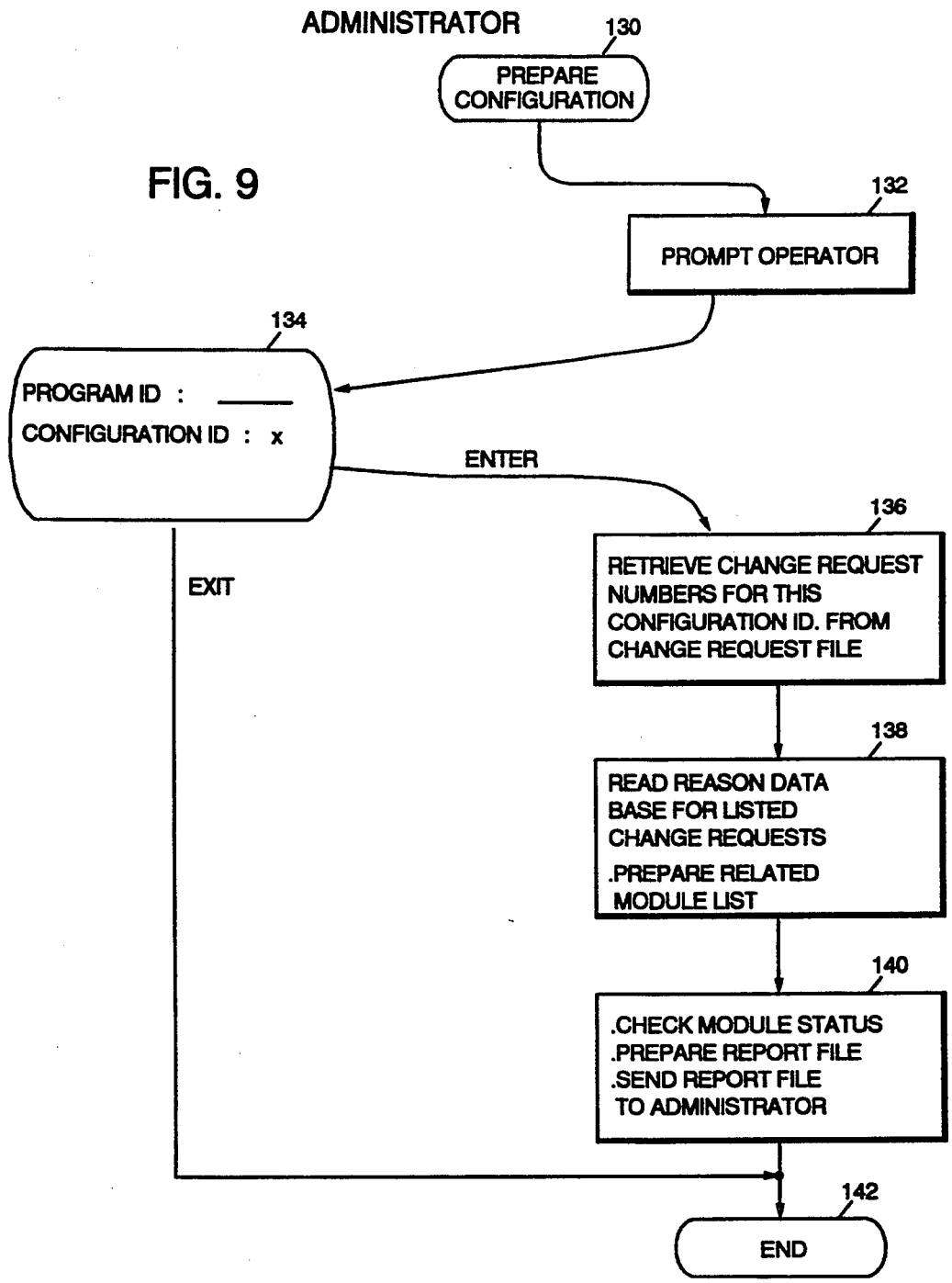
FIG. 9 shows the process implemented to prepare a new configuration.
Figure 11:
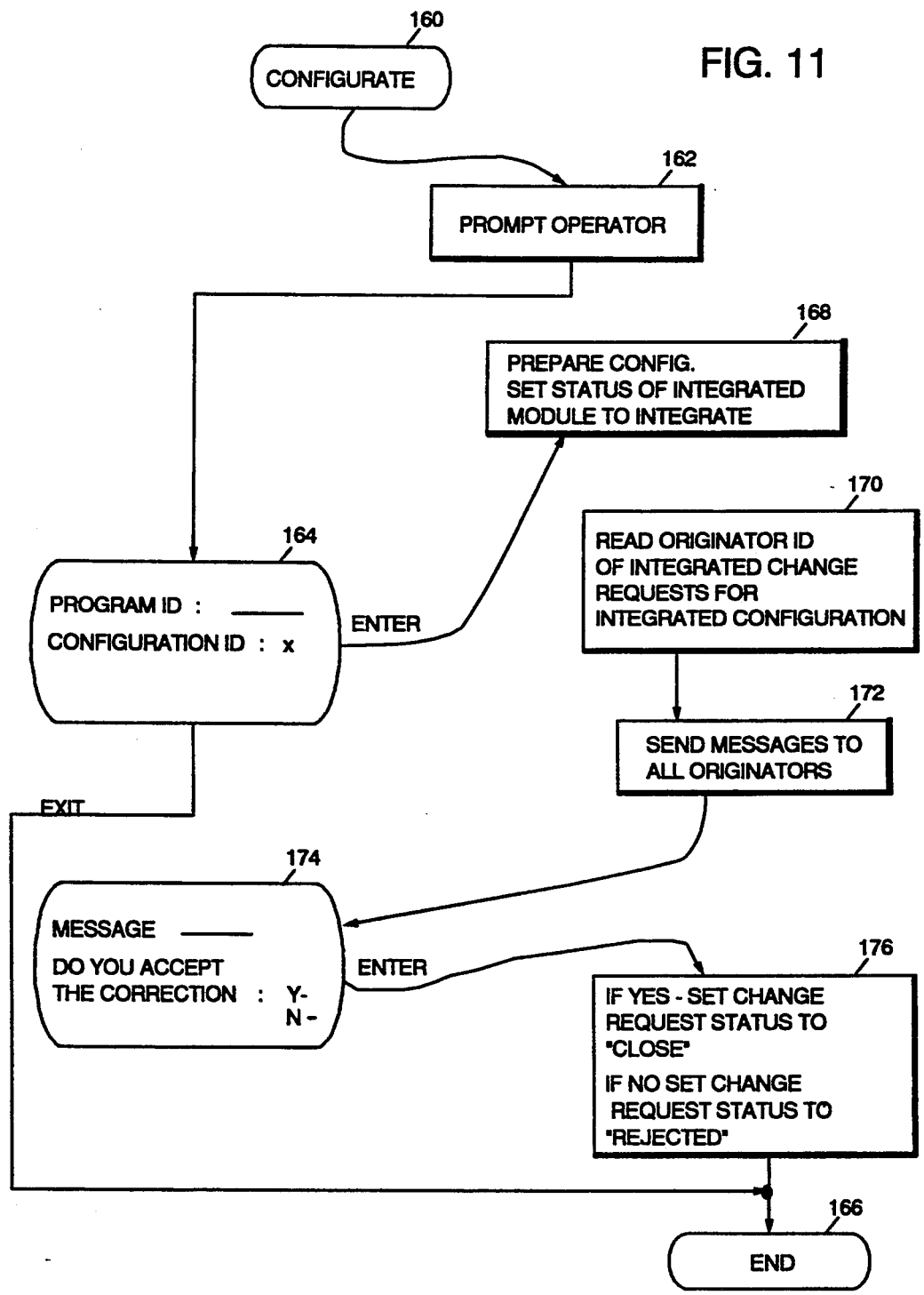
FIG. 11 shows the process implemented when the configuration is started.

The next process which is described in FIG. 9 consists in preparing a configuration. This is generally done by the library administrator. The process starts when the administrator enters a PREPARE CONFIGURATION command, which is received by the system as shown at 130. Then the system prompts the operator as shown at 132, with screen 134. The operator enters the program identification and the identification of the configuration he wants to be integrated.

At step 136, the system reads the change request file 74 and retrieve the change request numbers comprising the keyed in configuration identification for the subject program identification.

Then, at step 138 the system reads the reason table 115 (FIG. 8-A) and prepares a list of the module identifications related to the retrieved change request numbers.

At step 140, the status of the module listed at step 138 is read. The system prepares a report file 144 which is sent to the administrator.

This process is ended as shown at 142.

The report file 144 is shown in FIG. 10. It comprises a first part which includes for the specific configuration identification X keyed in on screen 12, the list of the change request numbers, for example 1 and 2, and for each change request a list of module identifications, with the corresponding corrector identification, function identification and status. In that list, all the modules have at least the CAPTURED status, it may happen that some modules have already an integrated status for the reasons which will be explained later on.

The second part 148 comprises a list of incomplete change request numbers for the same configuration identification X. This means that this list comprises the change request numbers for which some modules are still at the USER status.

The third part 150 comprises a list of the change request numbers for other configuration identifications, for example Y which affect modules listed in the parts 146 and 148. The status information is replaced by the other change request members related to the module identifications.

This report is analyzed by the administrator, to determine whether the configuration may be started. From this analysis, he may determine that a module to be integrated in the desired configuration is not in the CAPTURED status. In that case, he can decide not to integrate the corresponding change request. To do that, he modifies the configuration identification for the change request number in the request list through the process of FIG. 3. On the contrary, he may decide to urge the corrector to put his corrected module into the library.

The list of change request numbers in the third part 150, is analyzed to be sure that there is no conflict between the change request numbers listed in parts 146 and 148 and the change request numbers in part 150.

The detected conflicts are solved by changing the configuration identification in change request numbers in parts 146 and 148 not to be integrated, because they are in conflict with change requests in part 150 or by changing the configuration identification to X in change requests in part 150 which can be integrated in the configuration X.

When this analysis is completed, the process of FIG. 9 is re-started to obtain an updated report.

Eventually, the configuration X is started. This is done through a CONFIGURATE command which is decoded by the system as shown in step 160 in FIG. 11. Then, at step 162 the operator is prompted with screen 164. He keys in the program identification and configuration identification or exits. If he presses the exit key the process is ended at step 166, if not the system prepares the configuration by assembling all the modules listed in part 146 of the last report established through the process of FIG. 9 for the desired configuration X. This operation is conventional and will not be described in any more detail. It suffices to say that the modules are compiled and the configuration is tested.

The status of the integrated modules in reason table are set to INTEGRATE, at step 168.

Then, at step 170 the system reads the originator identification of the integrated change request numbers in the change request list of FIG. 4, i.e. the change request numbers of the first part 146 of the report on FIG. 10.

Messages are sent to all originators as shown by step 172. The messages are received by the originators at their workstations, as shown by screen 174.

The originators have to key in whether the corrections in the new configuration, are accepted or not.

If they accept the correction the system sets the status of the integrated change request to CLOSE, if not, no action is taken by the system.

If a change request is not accepted, the related modules keeps their INTEGRATED status and it results therefrom that it may happen that modules listed in a report such as shown in FIG. 10 are in an INTEGRATED status. The change request status is set to REJECTED. In that case a new configuration process has to be started.

After step 176, the process is ended at step 166.

What is claimed is:

1. A method for facilitating the configuration of programs having a plurality of functions by using a data processing system accessible by a plurality of users through workstations, said method comprising the steps of:

building a first table in response to data entered by a first user at a workstation, said first table representing the correspondence between each function of a program and a user assigned to said function;

building a second table in response to requests for creating or modifying specified functions, said requests originating from second users and said second table containing for each request, a request number and related information including a description of the requested work and a function assignee retrieved from the first table;

sending a message to the function assignee corresponding to each request stored in the second table, said message including the request number and the description of the requested work corresponding to said each request;

building a third table in response to third users starting the work requested per a selected request, said third table including for each request number, a status set to a first value (USER) when a user is performing the work, to a second value when the work is completed, and to a third value when the function is integrated in a program configuration; and reading said third table in response to a command from a fourth user indicating that a configuration is to be started, for preparing a report of the status of the requests.

2. The method according to claim 1, wherein each function comprises at least one module of code source, and each module is assigned to a module owner.

3. The method according to claim 2 wherein the step of building the first table, comprises the following steps:

sending by the first user a first command (CREATE TABLE) to the data processing system, prompting the first user by the data processing system in response to the first command, so that the first user enters to the data processing system, the identifications of the functions comprising the program, the function assignees, the identifications of the modules corresponding to each function and the identifications of the owner of each module.

4. The method according to any one of claims 1 to 3, wherein the step of building the second table, comprises the following steps:

sending by one of said second users a second command (CHANGE REQUEST) to the data processing system;

assigning by the data processing system a request number in response to the second command;

prompting the second user by the data processing system in response to the second command, so that the second user enters to the data processing, the identification of the function and the program configuration involved in the request made by the second user, and the description of the requested work; and retrieving by the data processing system the function assignee from the first table, and adding the request number and related information to the second table.

5. The method according to claim 4, wherein the second table comprises, for each request number, a status which is set to a first value (OPEN) for each request number and related information added to the second table.

6. The method according to claim 5, further comprising the steps of:

answering the message received by the function assignee, by sending a third command (ANSWER) to the data processing system;

prompting the function assignee answering the message, so that the function assignee enters to the data processing system whether the request identified in the message is accepted or rejected; and changing the status of the request number which is answered by the function assignee, to a second value (ANSWERED) if the request is accepted or to a third value (REJECTED) if the request is rejected.

7. The method according to claim 6 wherein the step of building the third table comprises the following steps:

sending a fourth command (LIST CHANGE REQUEST) to the data processing system by third users involved in the work requested on a specified function by requests from second users;

prompting the third users by the data processing system, so that the third users enters the identification of the specified function and/or the identification of the assignee and a request status;

receiving the information entered by the third users and sorting from the second table, the request numbers corresponding to the entered status and function assignee identification, which are sent to the third users with the description of the work requested by the sorted request numbers;

selecting a request number by each third user;

prompting each of said third users by the data processing system in response to the selection of a request number by said each third user, so that said each third user enters the identification of a module which has to be worked on to implement the work requested by the selected request number; and receiving the request number selected by the third user, the identification of the module entered by the third user and adding the module identification to the third table, whereby, the third table is built and comprises for each request number, the identification of the modules which are to be worked on to perform the work requested per the change request number and the status of the module, which is set to the first value (USER) when the third user works on the module, to the second value (CAPTURED) when the third user has completed the work, and to the third value when the module is integrated in a program configuration.

* * * * *